US012492024B1

(12) United States Patent
Hsu

(10) Patent No.: US 12,492,024 B1
(45) Date of Patent: Dec. 9, 2025

(54) SYSTEM AND METHOD FOR A SUBSTRATE FILLING MACHINE

(71) Applicant: Wei K Hsu, Parker, TX (US)

(72) Inventor: Wei K Hsu, Parker, TX (US)

( * ) Notice: Subject to any disclaimer, the term of this patent is extended or adjusted under 35 U.S.C. 154(b) by 0 days.

(21) Appl. No.: 18/953,886

(22) Filed: Nov. 20, 2024

(51) Int. Cl.

| | |
|---|---|
| ***B65B 1/06*** | (2006.01) |
| ***A01G 18/22*** | (2018.01) |
| ***B65B 43/18*** | (2006.01) |
| ***B65B 43/30*** | (2006.01) |
| ***B65B 57/00*** | (2006.01) |
| ***B65B 61/28*** | (2006.01) |

(52) U.S. Cl.
CPC ................ *B65B 1/06* (2013.01); *A01G 18/22* (2018.02); *B65B 43/18* (2013.01); *B65B 43/30* (2013.01); *B65B 57/00* (2013.01); *B65B 61/28* (2013.01)

(58) Field of Classification Search
CPC ......... B65B 1/06; B65B 43/123; B65B 43/18; B65B 43/267; B65B 43/30; B65B 43/44; B65B 57/00; B65B 57/06; B65B 61/28; B65B 39/002; A01G 18/20; A01G 18/22
USPC .................... 53/459, 571, 573, 386.1; 47/1.1
See application file for complete search history.

(56) References Cited

U.S. PATENT DOCUMENTS 3,501,893 A * 3/1970 Peterson ................. B65B 43/18 53/386.1
3,566,578 A * 3/1971 Thorne et al. .......... B65B 43/18 53/386.1
3,673,759 A * 7/1972 Ayres et al. ............ B65B 43/18 198/468.4
3,830,038 A * 8/1974 Propst ..................... B65B 43/30 53/77
3,943,687 A * 3/1976 Cerioni ................... B65B 43/18 53/571
4,027,459 A * 6/1977 Nieskens et al. ....... B65B 61/28 53/244

(Continued)

FOREIGN PATENT DOCUMENTS

JP H06113671 A * 4/1994
JP H11105827 A * 4/1999

OTHER PUBLICATIONS

Alibaba, date:N/A, 10 pages, https://www.alibaba.com/showroom/substrate-bagging-machine.html.

(Continued)

*Primary Examiner* — Stephen F. Gerrity
(74) *Attorney, Agent, or Firm* — Goodhue, Coleman & Owens, P.C.

(57) ABSTRACT

A filling machine and method for filling bags with substrate. Bags are received in a receptacle of a filling machine. Substrate is received in a hopper of the filling machine. An activation signal is received through a user interface of the filling machine. A first pneumatic arm is moved to abut an opening for a first side of a bag that is one of the bags. Suction is applied to the bag utilizing one or more nozzles integrated with the first pneumatic arm. The bag is moved to a fill location. A second pneumatic arm is moved to abut the opening on a second side of the bag. Suction is applied to the bag utilizing one or more second nozzles integrated with the second pneumatic arm. At least one of the first pneumatic arm and the second pneumatic arm are retracted to open the opening of the bag. Substrate is released into the bag. The bag is moved from the filling location to a storage location.

20 Claims, 11 Drawing Sheets

(56) References Cited

U.S. PATENT DOCUMENTS

| | | | | | |
|---|---|---|---|---|---|
| 4,182,094 | A * | 1/1980 | Lieder et al. | B65B 43/30 | 271/227 |
| 4,320,615 | A * | 3/1982 | Gmur | B65B 43/30 | 53/67 |
| 4,741,122 | A * | 5/1988 | Becsy et al. | A01G 18/20 | 47/1.1 |
| 4,823,538 | A * | 4/1989 | Takamura | B65B 43/30 | 53/284.7 |
| 4,922,650 | A * | 5/1990 | Akao et al. | A01G 18/22 | 414/218 |
| 5,201,166 | A * | 4/1993 | Johnsen | B65B 43/18 | 141/114 |
| 5,626,004 | A * | 5/1997 | Gates et al. | B65B 37/02 | 53/469 |
| 5,659,997 | A * | 8/1997 | Sprehe et al. | A01G 18/66 | 47/1.1 |
| 7,877,966 | B2 | 2/2011 | Knoke | | |
| 9,561,902 | B1 * | 2/2017 | Veix | B65B 39/002 | |
| 9,688,423 | B2 * | 6/2017 | Metzger | B65B 43/123 | |
| 10,934,042 | B2 | 3/2021 | Frei | | |
| 2015/0298841 | A1 | 10/2015 | Ensor | | |

OTHER PUBLICATIONS

AliExpress, Date:N/A, 1 page, https://www.aliexpress.us/item/3256803997714427.html?gatewayAdapt=glo2usa4itemAdapt.

Made-in-China, Jan. 30, 2016, 1 page, https://hlchinafood.en.made-in-china.com/product/qQKpWeUbhohE/China-Fully-Mushroom-Substrate-Mixer-Bagger-Growing-Bag-Filling-Mushroom-Logs-Bagging-Machine-Full-Automatic.html.

MIKIM, Date:N/A, 2 pages, https://www.woodpellets-machine.com/supplier-624536-mushroom-bagging-machine.

Myers Mushrooms, date: N/A, 11pages, https://myersmushrooms.com/product/automatic-wet-bagger-bagging-system/.

Satrise, date:N/A, 6 pages, https://www.satrise.com/products/full-automatic-capping-and-bagging-machine/.

Volumetric Technologies, Nov. 2024, 9 pages, https://volumetrictechnologies.com?gad_source=1&gclid=Cj0KCQjwzva1BhD3ARIsADQuPnWCYB81RS6z5u-yXYsKjEMIhbNkhXrltiJszb8gs_Yd6_B16580fglaAtVpEALw_wcB.

* cited by examiner

SYSTEM AND METHOD FOR A SUBSTRATE FILLING MACHINE

BACKGROUND

Mushroom and indoor cultivation and growing have grown significantly in recent years. Mushroom cultivation requires bagged material in special bags, such as soil, compost, dirt, or other substrates. In these industries, maintaining efficiency, consistency, and speed in the production process is crucial for maximizing yield and profitability. Traditional methods of filling bags with substrate are often labor-intensive, slow, and prone to inconsistency, leading to inefficiencies in large-scale production settings.

Mushroom cultivation, in particular, requires precise control over the substrate mix, moisture content, and bag packing density to ensure optimal growth conditions. In conventional setups, the process of mixing, filling, and sealing substrate bags is done manually or with semi-automated equipment, which introduces variability and limits production scale. Similarly, in industries that require large-scale filling of bags with soil or similar materials, consistent bag weight and fill are essential for product quality and customer satisfaction.

Existing machines for bagging materials are either specialized for a narrow range of substrates or lack the adaptability needed for diverse operational requirements. They may be inefficient in handling various substrate textures, densities, and moisture levels. Additionally, manual or semi-automated operations increase the potential for contamination in mushroom farming, which may lead to reduced crop yields.

There is a need for a machine that can automate the process of filling bags with substrate, while offering adjustable settings to handle different materials, ensuring uniform filling, reducing labor costs, and improving overall productivity.

SUMMARY

An illustrative embodiment provides a filling machine and method for filling bags with substrate. Bags are received in a receptacle of a filling machine. Substrate is received in a hopper of the filling machine. An activation signal is received through a user interface of the filling machine. A first pneumatic arm is moved to abut an opening for a first side of a bag that is one of the bags. Suction is applied to the bag utilizing one or more nozzles integrated with the first pneumatic arm. The bag is moved to a fill location. A second pneumatic arm is moved to abut the opening on a second side of the bag. Suction is applied to the bag utilizing one or more second nozzles integrated with the second pneumatic arm. At least one of the first pneumatic arm and the second pneumatic arm are retracted to open the opening of the bag. Substrate is released into the bag. The bag is moved from the filling location to a storage location.

Another embodiment provides a bag filling machine. The bag filling machine includes a frame supporting components of the filling machine. The bag filling machine includes a controller controlling operations of the filling machine. The bag filling machine includes a hopper extending from the frame storing substrate. The bag filling machine includes a fill receptacle extending from below the hopper for dispensing the substrate. The bag filling machine includes a bag holder extending from the frame for storing a plurality of bags including the bag. The bag filling machines includes a first pneumatic arm configured to rotate and extend to retrieve the bag from a first side. The bag filling machine includes one or more vacuum applicators at a distal end of the first pneumatic arm to secure the bag from the first side. The bag filling machine includes a second pneumatic arm configured to extend to abut the bag from a second side. The bag filling machine includes one or more second vacuum applicators at a distal end of the second pneumatic arm to secure the bag from a second side. The bag filling machine includes a conveyor configured to move a filled big from a filling location to a second location.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1:
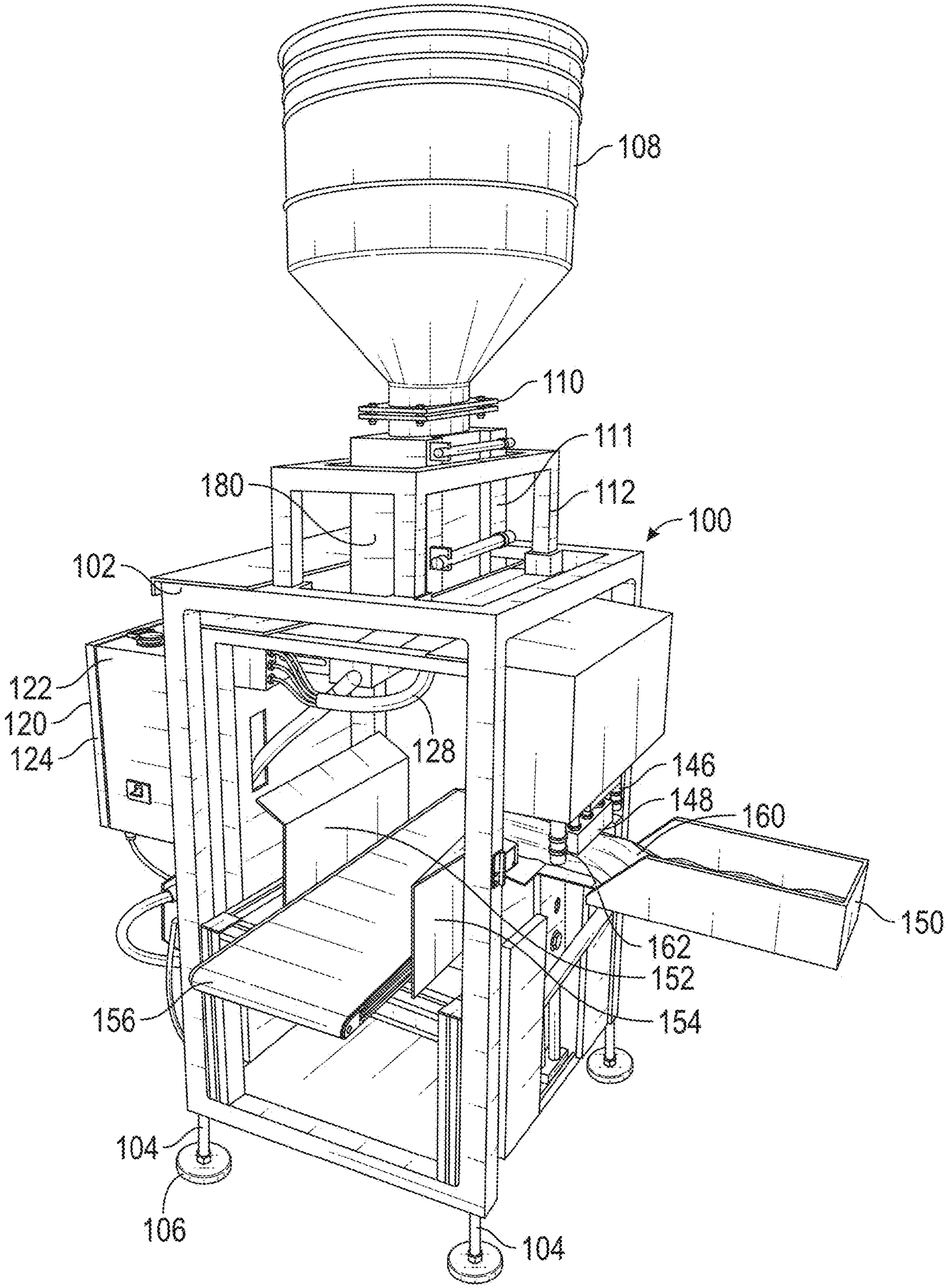
FIG. 1 is a perspective view of a filling machine in accordance with an illustrative embodiment.
Figure 2:
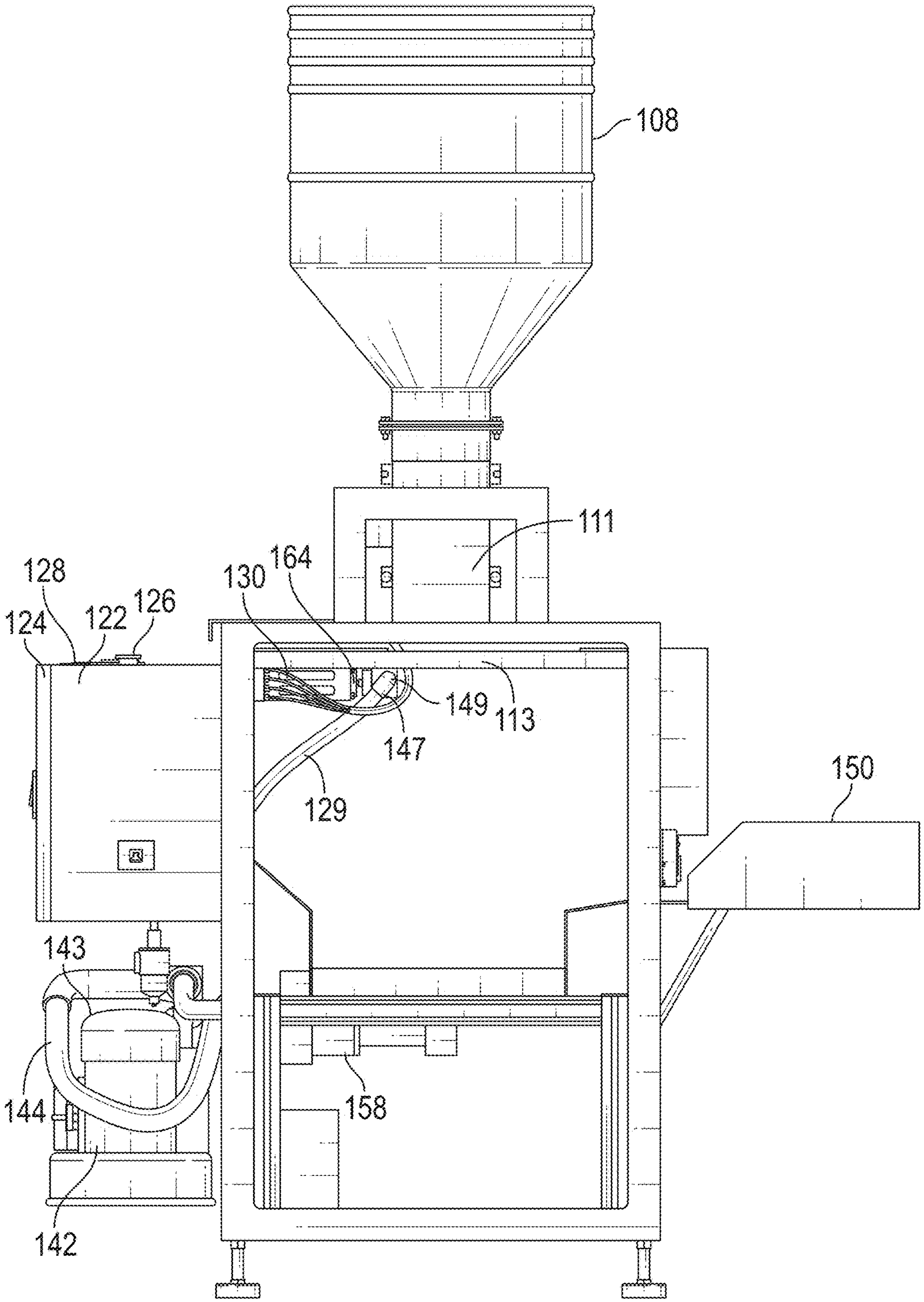
FIG. 2 is a side view of the filling machine of FIG. 1 in accordance with an illustrative embodiment.
Figure 3:
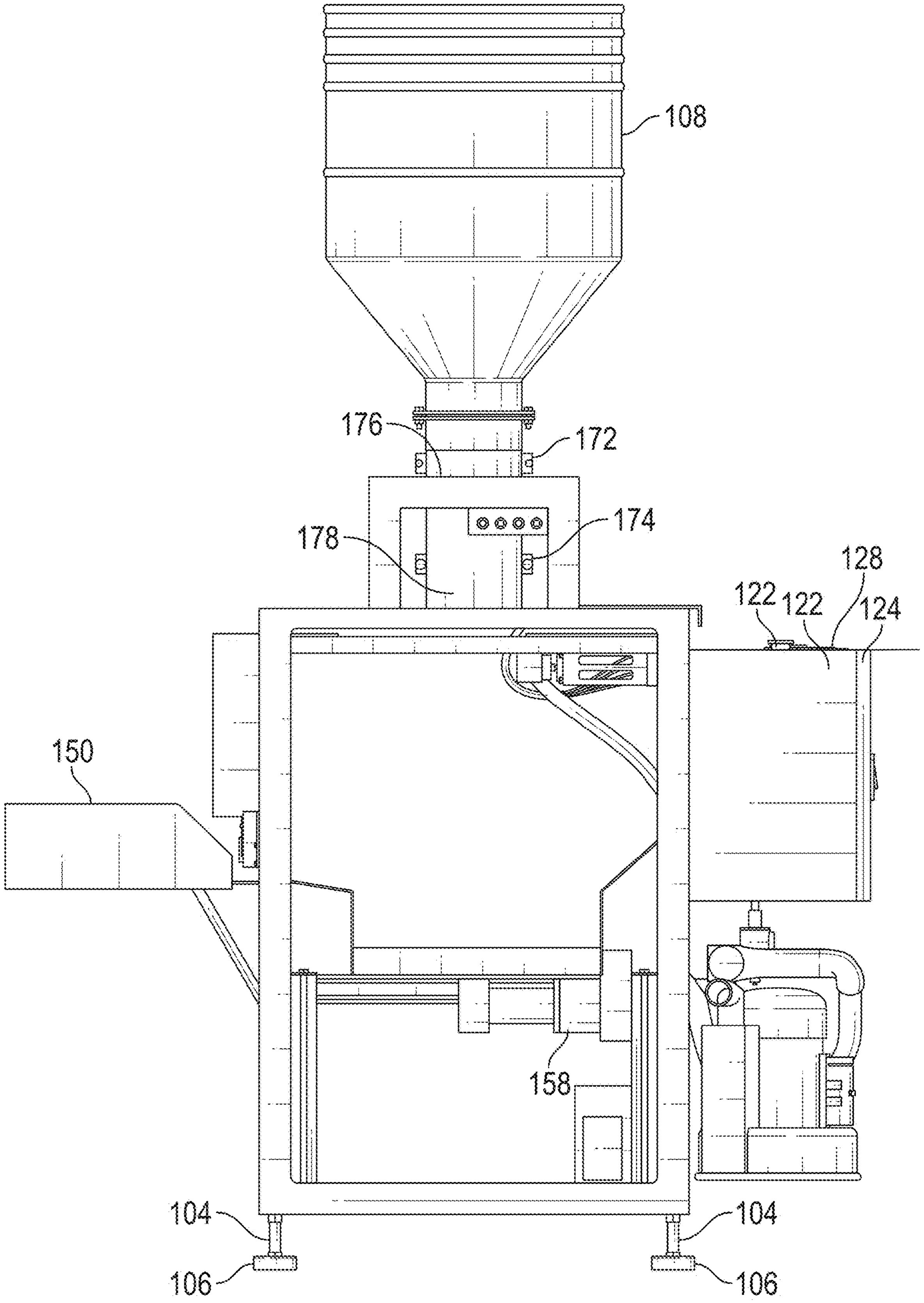
FIG. 3 is another side view of the filling machine of FIG. 1 in accordance with an illustrative embodiment.
Figure 4:
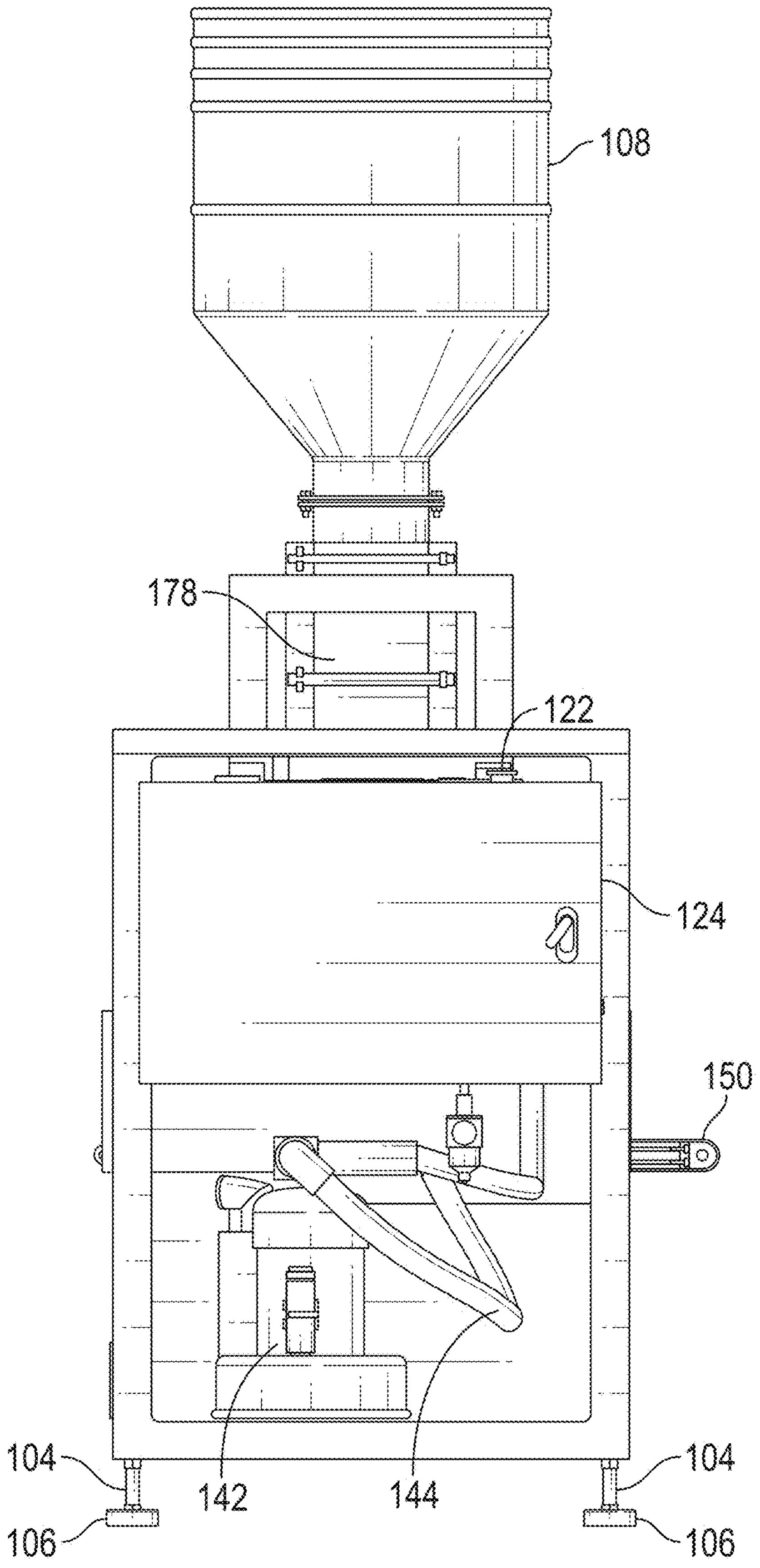
FIG. 4. is a front view of the filling machine of FIG. 1 in accordance with an illustrative embodiment.
Figure 5:
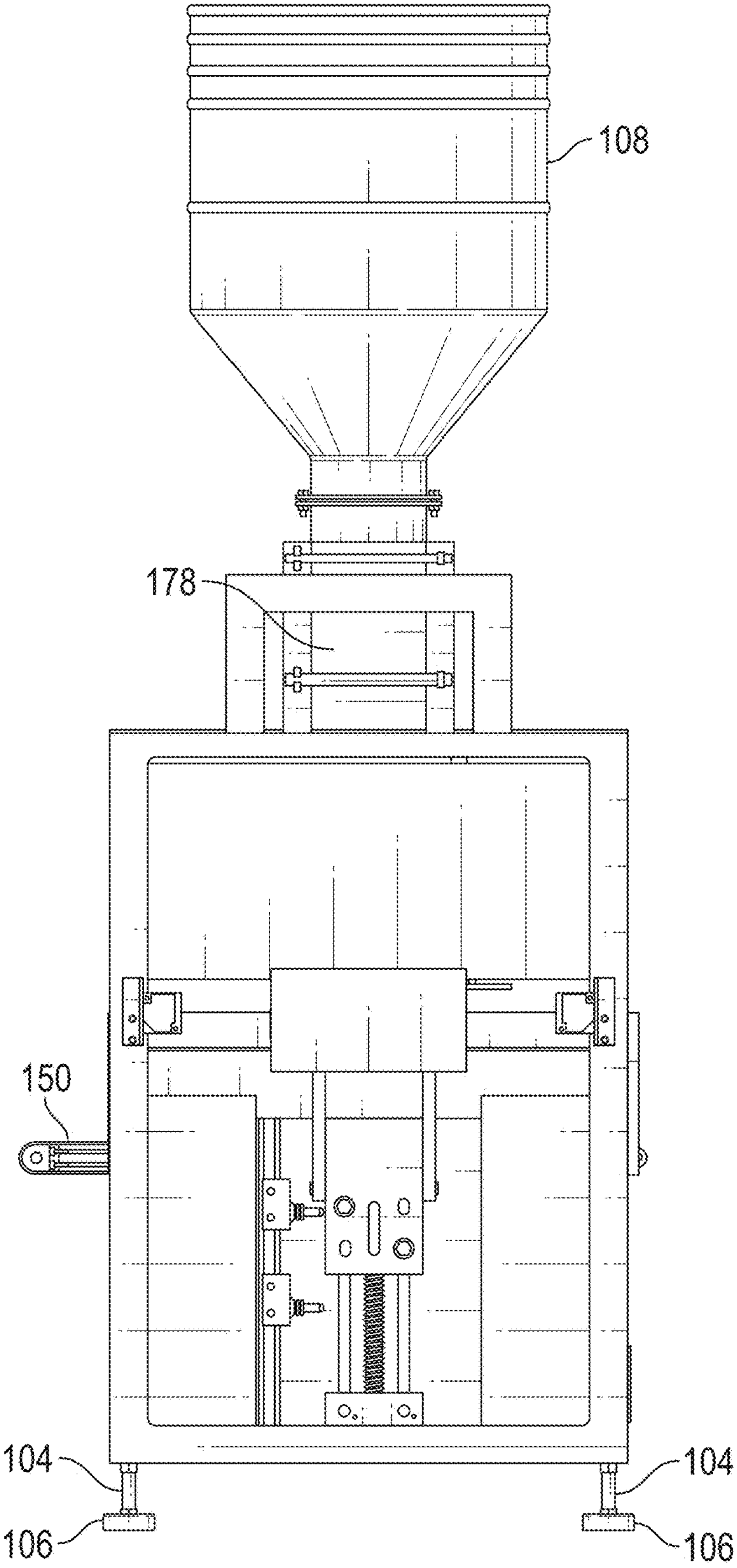
FIG. 5 is a back view of the filling machine of FIG. 1 in accordance with an illustrative embodiment.
Figure 6:
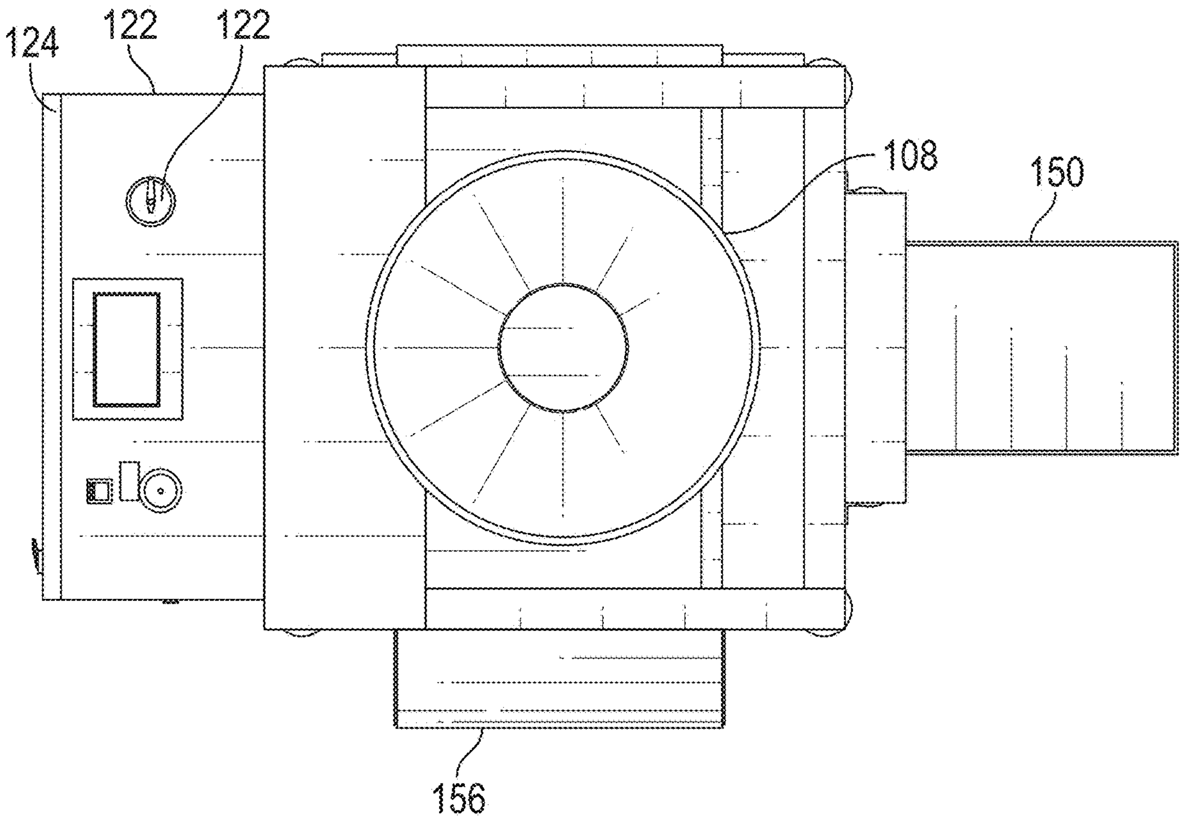
FIG. 6 is a top view of the filling machine of FIG. 1 in accordance with an illustrative embodiment.
Figure 7:
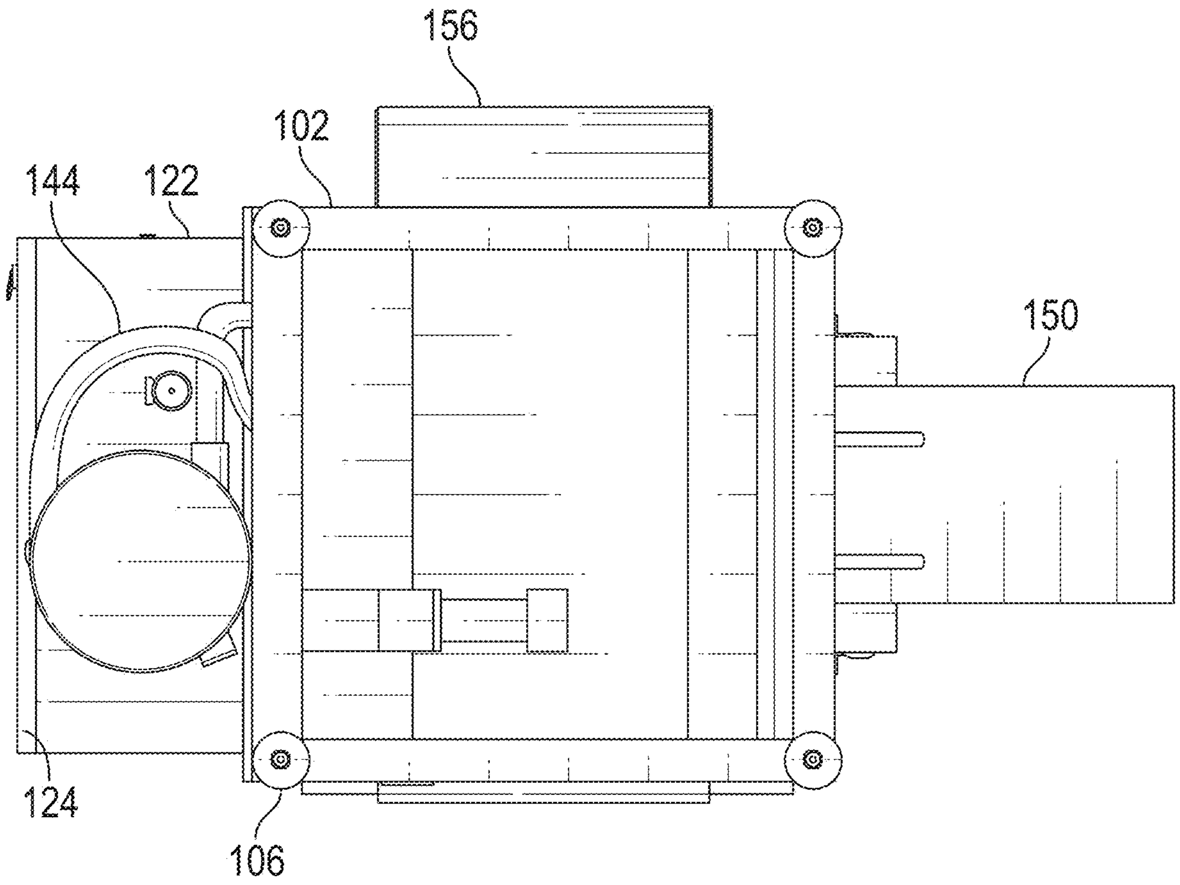
FIG. 7 is a bottom view of the filling machine of FIG. 1 in accordance with an illustrative embodiment.

The illustrative embodiments provide a system, filling machine, and method for substrate filling. The various embodiments provide a versatile, fully automated system designed to optimize substrate filling. For example, the bag filling processes may be utilized for mushroom growing operations and other industries requiring efficient, automated, and high-volume bag filling. The illustrative embodiments relate to automated machines and systems for filling bags with substrate, particularly for use in the mushroom cultivation industry and other industries requiring bagged material like soil, compost, or dirt. In these industries, maintaining efficiency, consistency, and speed in the production process is crucial for maximizing yield and profitability. The filling machine and filling system as described herein may be utilized with various substrates.

The filling machine may include a controller that controls the operation, movement, and coordination of the various parts of the filling machine. The filling machine utilizes a number of pneumatic arms powered by a compressor (e.g., air cylinders) and suction applicators at the ends of the pneumatic arms powered by a vacuum to retrieve bags, open the bags, move the bags below a hopper holding the substrate, and fill the bags to a desired level. The first pneumatic arm is configured to rotate and extend to retrieve a first side of an empty bag with a suction force, move the bag below a filling location (e.g., retract, rotate, and extend), and hold the bag while a second pneumatic arm extends to secure the second side of the empty bag with a suction force. The pneumatic arms may release the bag onto a conveyor or other moving device once filled. The pneumatic arms may both rotate/pivot and extend and retract to perform the required motions. The pneumatic arms may be rotary actuators to specifically control rotation and extension of the pneumatic arms. The pneumatic arms may also have rotary joints or swivel joints that allow for proper rotation and movement of the pneumatic arms. The connections may also utilize shaft and collar mechanisms, bearings, turntable bearings, and/or slewing ring bearings.

The pneumatic arms may include suction applicators or tips that suction the bags at one or more points. The suction applicators may include rubberized, plastic, or metal suction tips for best gripping the plastic, polymer, paper, composite, and/or different bag types.

A variety of substrates may be used for mushroom cultivation, each offering distinct benefits to optimize growth conditions. Suitable substrates include lignocellulosic materials such as straw, wood chips, sawdust, and agricultural by-products like corn cobs and cottonseed hulls. Additionally, enriched substrates such as composted manure, coffee grounds, and spent brewer's grains may be employed to provide essential nutrients and enhance yield. Supplementation with bran, gypsum, and other mineral additives may further improve substrate performance, creating an ideal environment for the propagation and fruiting of various mushroom species. The illustrative embodiments attempt to overcome the limitations of current bagging systems, offering features that ensure precise control over substrate consistency, automated bag filling, and adaptability to various materials, thereby enhancing production efficiency, reducing labor costs, and improving end-product quality. Turning now to FIGS. 1-7 showing a filling machine 100 in accordance with an illustrative embodiment. The filling machine of FIGS. 1-7 show one embodiment of the filling machine 100. The filling machine 100 is one embodiment of a device for filling bags with a substrate, such as dirt, compost, and/or other fillers. The filling machine may include any number of components including a frame 102, supports 104, feet 106, a hopper 108, the collar 110, a filling mechanism 111, a support 112, a dispenser 113, a controller 120, and controller box 122, a panel 124, a power button 126, user interface 128, a bus 129, wires 130, compressor 142, vacuum 143, hoses 144, a pneumatic arms 146, 147, suction applicator 148, 149, a bag holder 150, guides 152, 154, a conveyor 156, a motor 158, bag/bags 160, sensors 162, 164.

The filling machine 100 is configured to quickly and efficiently fill bags 160 with substrate or dirt. In one embodiment, bags 160 are added to the bag holder 150. The bags 160 may be added with an opening end (facing toward the center of the machine) positioned adjacent the pneumatic arm 146 to be quickly and efficiently retrieved. The bags 160 may represent standard bags or custom bags with a filter for growing fungi. In one embodiment, the bags 160 may be manually added by a user of the filling machine 100. In another embodiment, the bags 160 may be fed into the bag holder 150 by an additional conveyer, robotic arm, elevator, or so forth. As shown the bag holder 150 keeps the bags 160 in position even in a busy working facility with different airflows and changing environments.

The controller 120 controls the operation of the various components of the filling machine 100. In particular, the controller 120 ensures that the bags 160 are efficiently retrieved, opened, filled, and moved from the filling machine 100. The controller 120 controls the operation of the various electrical, pneumatic, and vacuum powered components. The controller 120 may be a programmable logic controller (PLC) or other suitable computing device configured to control the operation of the filling machine 100. The controller 120 receives input signals from various sensors 162, 164 and pneumatic arms 146, 147/actuators within the filling machine 100, such as sensors for detecting the location, position, and orientation of the pneumatic arms 146, 147, presence of a substrate in the fille receptacle 180, the level of fill material, and the position of the bag 160. The controller 120 processes these input signals to determine the appropriate actions to be taken, such as activating or deactivating motors 158, stops 176, 178, valves, compressors 142, vacuums 143, and pumps. The controller 120 also generates output signals to control the retrieval and movement of the bag 160, the dispensing of filling material, and the timing of the filling process. Additionally, the controller 120 may be configured to monitor the performance of the filling machine 100, detect and diagnose faults, and provide feedback to the operator.

In one embodiment, the hopper 108 is filled with the applicable substrate. The hopper may be funnel shaped, conically shaped, reverse pyramid shaped, or have a combination of shapes as shown. The hopper 108 may be filled manually or utilizing one or more automatic or manual shovels, conveyers, elevators, carts, crane-based systems, or so forth. For example, a user may fill the hopper 108 utilizing a shovel. The filling mechanism 111 is designed to dispense a precise amount of substrate into a bag using an automated process. The filling mechanism 111 is fed substrate by the hopper 108 through the filling mechanism 111 through the dispenser 113. The flow rate and quantity are regulated by sensors and an adjustable timing system connected to the filling mechanism 111 to ensure accurate filling. The bag-holding components securely holds the bag 160 in place beneath the dispenser 113, and once the desired substrate quantity is dispensed, the dispenser 113 closes automatically to prevent spillage, ensuring clean and efficient operation.

In one embodiment, the filling mechanism 111 may include pneumatic arms 172, 174, stops 176, 178, and fill receptacle 180. In one embodiment, the stops 176, 178 may be plates attached to the pneumatic arms 172, 174, respectively. The pneumatic arms 172 may retract the stop 176 to add substrate from the hopper 108 into the fill receptacle 180. The pneumatic arms 172 may extend the stop 176 at the top of the fill receptacle to stop filling the fill receptacle 180 from the hopper 108. The fill receptacle 180 may be sized and shaped for the amount of substrate that is required for the bags 160. In one embodiment, the fill receptacle 180 may be positioned and shaped for filling the bags 160 to specified amounts of substrate. Alternatively, the size or shape of the fill receptacle 180 may be adjusted utilizing one or more moving walls (e.g., sidewalls, bottom, top, etc.). Once the fill receptacle 180 has been filled from the hopper 108, the pneumatic arms 174 may retract the stop 178 allowing the substrate to flow through the dispenser 113 into the bag 160 positioned below the dispenser 113. When activated by the controller 120, the pneumatic arms 174 are retracted to release the substrate from the fill receptacle through the dispenser 113. The pneumatic arms 174 may then extend the stop 178 so that the fill receptacle 180 may be refilled by the hopper 108.

The pneumatic arms 146 extends the suction applicator 148 vertically (downward toward the ground) to retrieve the bag 160. The suction applicator 148 applies suction to a first side of the bag 160 to retrieve the bag 160 from the bag holder 150. The pneumatic arms 146 may retract with the bag 160 suction against the suction applicator 148 to ensure that the stack of bags is not disturbed when the bag 160 is retrieved. The pneumatic arm 146 and corresponding suction applicator 148 rotates toward the center of the filling machine below the hopper 108. The pneumatic arm 147 and corresponding suction applicator 149 extend from a default or retracted position against the suction applicator 148 to suction a second side of the bag. The suction applicators 148, 149 both grip the bag 160 near an open side of the bag 160. The pneumatic arms 146, 147 pull away from each other to open the bag 160 to be filled with substrate. The pneumatic arms 146, 147 move to preprogrammed locations to perform the various tasks utilized to retrieve the bag 160, move the bag 160 into position, opened the bag 160, and release the bag 160 onto the conveyor 156. The pneumatic arms 146, 147 may include integrated sensors or measurement mechanisms that indicate the positions, location, orientation/angle, and applied pressure of the pneumatic arms and/or suction applicators 148, 149.

The sensors 162, 164 may be integrated into the pneumatic arms 146, 147 and/or suction applicators 148, 149. The sensors 162, 164 may include a variety of sensor types to monitor the position, movement, orientation, pressure, extension/retraction, and performance of the pneumatic arms 146, 147. These sensors 162, 164 may include linear position sensors such as magnetostrictive sensors or LVDTs, which track the linear displacement of the pneumatic arms 146, 147, providing precise position feedback. The sensors 162, 164 may also include rotary encoders, either optical or magnetic, that may be employed to measure angular position and rotation speed, enabling accurate control of rotational movements. Additionally, the sensors 162, 164 may also include proximity sensors, including inductive or capacitive types, that detect the proximity of the pneumatic arms 146, 147 to other components of the filling machine 100. The sensors 162, 164 may also include dynamic motion tracking, inertial measurement units (IMUs) incorporating accelerometers and gyroscopes that may be used to monitor acceleration and angular velocity. Force or torque sensors, such as strain gauges or load cells, may provide real-time feedback on the forces acting on the pneumatic arms 146, 147 during operation and the forces applied by the suction applicators 148, 149. Moreover, pneumatic pressure sensors may monitor internal air pressure, offering an indirect measurement of arm position by correlating pressure with movement. These sensors 162, 164 work in conjunction to enable precise, responsive, and automated control of the pneumatic arms 146, 147.

The guides 152, 154 ensure that the bag 160 move properly within the filling machine 100. For example, the guides 152, 154 ensure that the bag 160 does not get caught on internal components of the filling machine 100 as the bags 160 are loaded and move along the conveyor 156. In one embodiment, the guides 152, 154 may be vertical plates with an outwardly extending flap as shown. The guides 152, 154 may be positioned vertically or at an angle.

The conveyor 156 is configured to transport bags 160 along a predefined path within or external to the filling machine 100 facilitating the automated handling and processing of the bags 160. The conveyor 156 includes a motorized belt or chain driven mechanism powered by the motor 158. The conveyor 156 may include one or more conveyors that move the filled bags to a receptacle (e.g., box, station, etc.), user, boxing area, filling or sealing area, or other predetermined location. The motor and conveyor 156 are adaptable to bags 160 of varying sizes and weights. In addition, the speed of the conveyor 156 may be adjusted by the controller 120. The conveyor 156 ensures efficient and consistent movement of the bags 160 to minimize handling and optimize throughput. In one embodiment, the conveyor 156 may include an integrated or attached scale for measuring the weight of each filled bag 160 to ensure consistency and required results.

The supports 104 and the feet 106 extend from the frame 102. The supports 104 and feet 106 provide a stable base for the filling machine 100. The supports 104 may be threaded so that the feet 106 may be adjusted up or down based on irregularities or imperfections in the floor, ground, or applicable surface the filling machine 100 is utilized on. For example, the feet 106 may be screwed in or out of the supports 104 to adjust the high and positioning of each of the feet 106.

Figure 8:
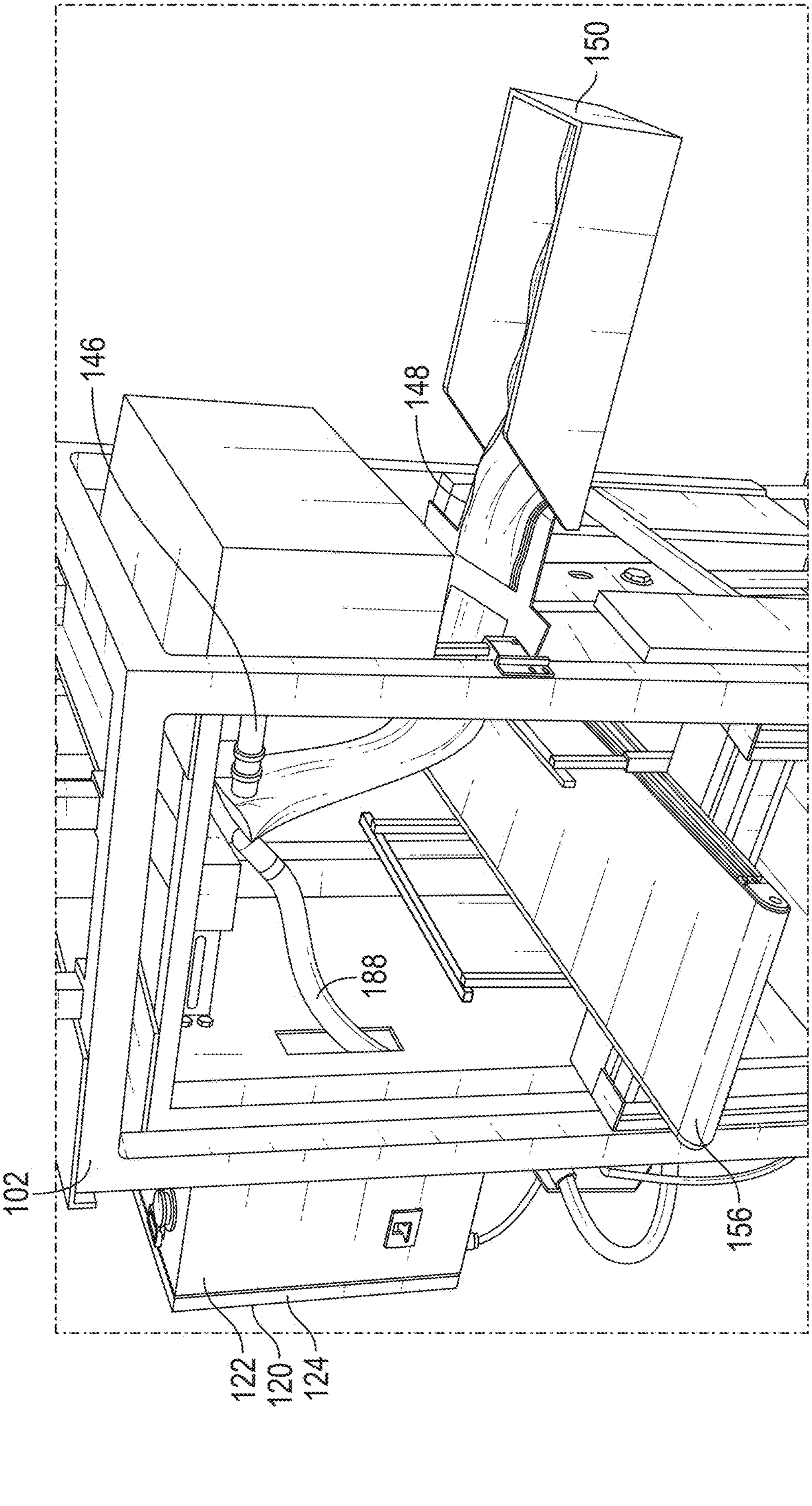
FIG. 8 is a perspective view of the filling machine of FIG. 1 retrieving a bag in accordance with an illustrative embodiment.
Figure 9:
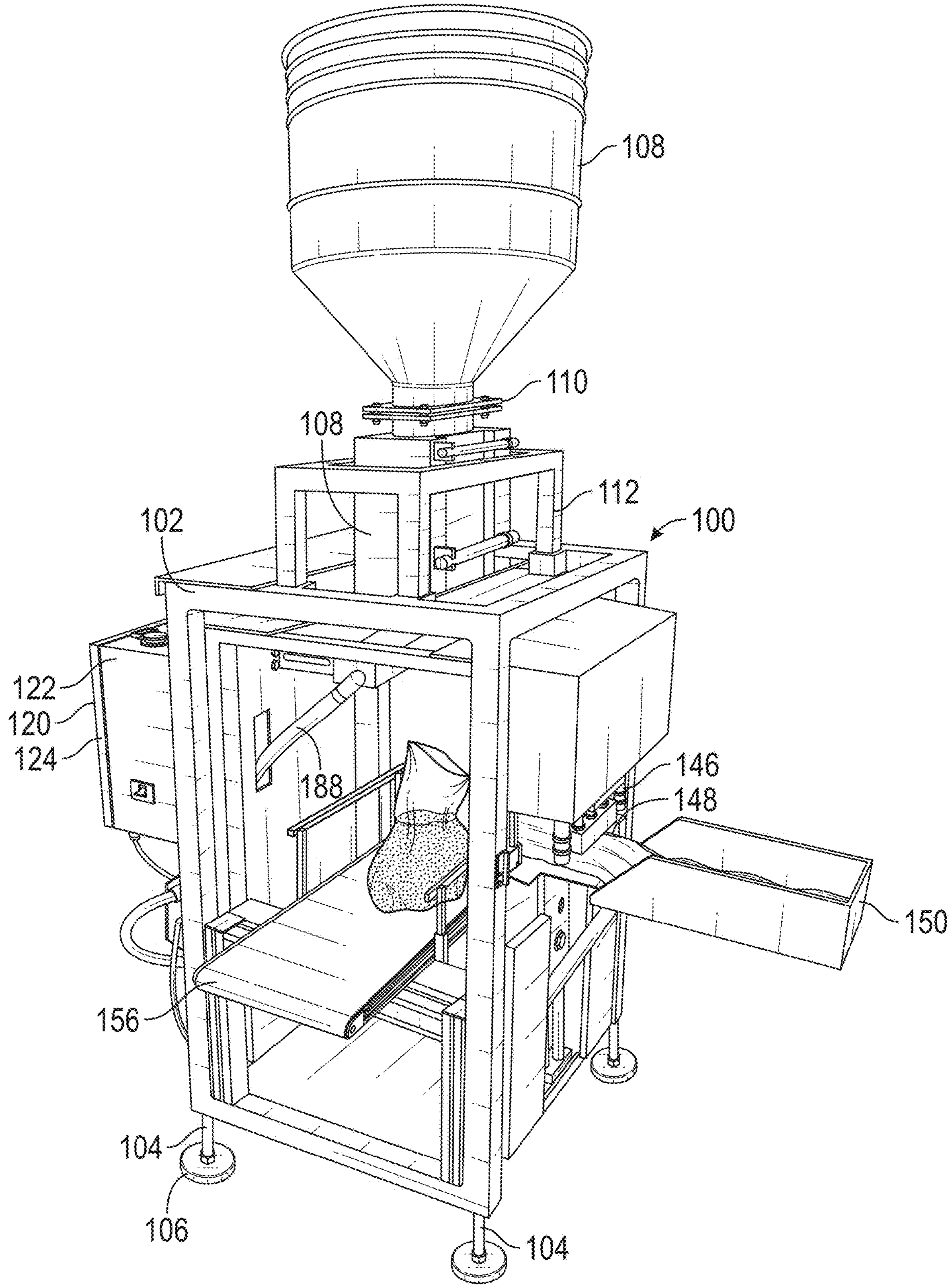
FIG. 9 is a perspective view of the filling machine of FIG. 1 with a filled bag in accordance with an illustrative embodiment.

FIG. 8 is a pictorial representation of the pneumatic arms opening a bag 160 in accordance with an illustrative embodiment. As previously described, the pneumatic arms 146 rotates inward to be below the hopper 108 and fill receptacle 180 and proximate the pneumatic arms 147. One or both of the pneumatic arms 146, 147 may retract once suction is applied to open the bag 160. As shown in FIG. 9, the bag 160 may be filled with the substrate or other filler to generate a filled bag.

In one embodiment, the pneumatic arms 147 may be configured only to extend and retract. Alternatively, the pneumatic arms 147 may be configured to rotate as well to open the bags 160 at the correct angle.

Figure 10:
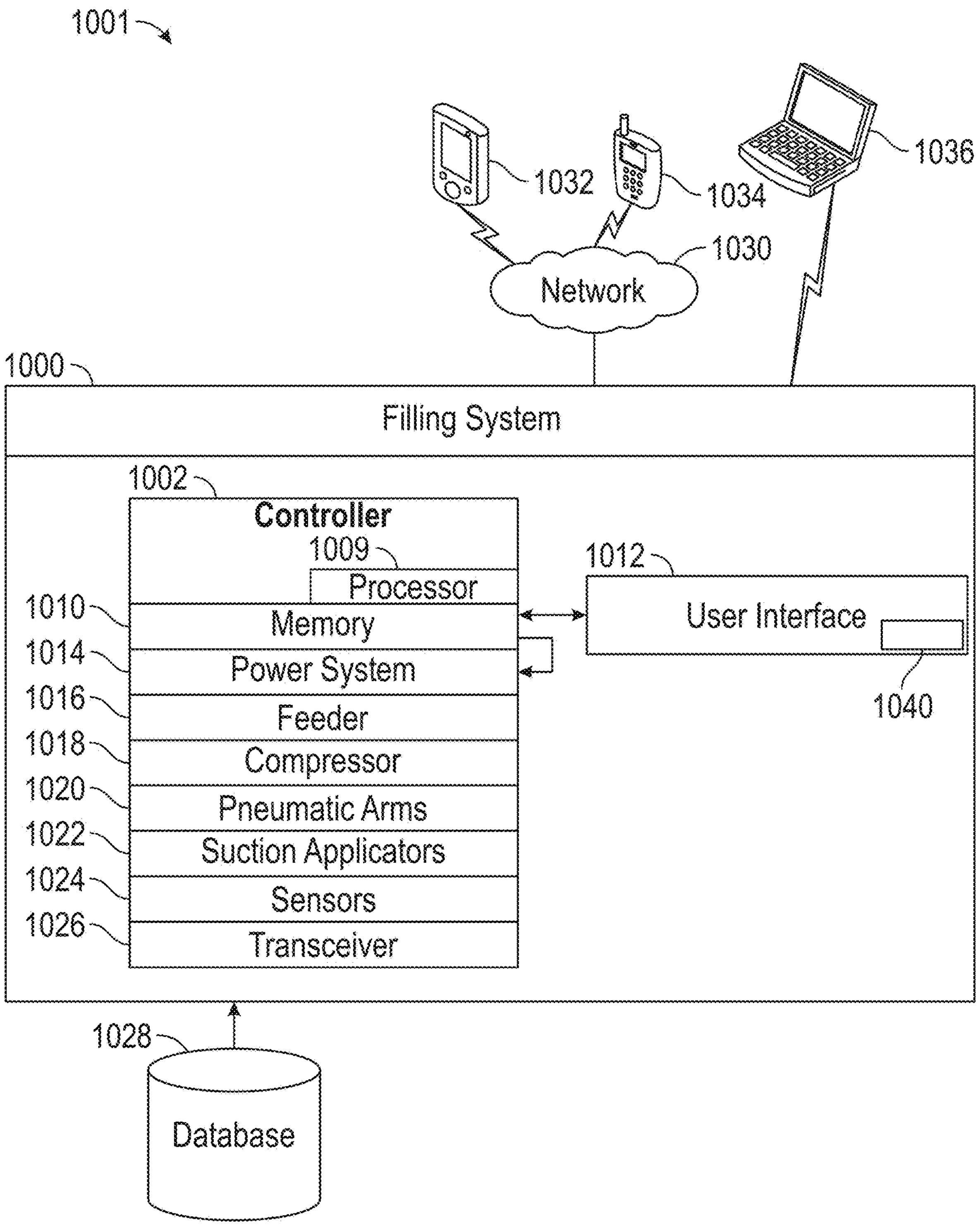
FIG. 10 is a pictorial representation of a bag filling system in accordance with an illustrative embodiment.

FIG. 10 is a pictorial representation of a bag filling system 1000 in accordance with an illustrative embodiment. The bag filling system 1000 may include a controller 1002, a processor 1009, a memory 1010, a user interface 1012, a compressor 1018, pneumatic arms 1020, suction applicators 1022, sensors 1024, power system 1014.

The bag filling system 1000 is configured to be easily moved and positioned. In one embodiment, the bag filling system 1000 is powered through a connection to a standard wall for convenience, such as a standard wall outlet (e.g. 120 V). However, the bag filling system 1000 may be configured to be powered by any number of power standards, wiring/interfaces, systems, or equipment available throughout the world. The bag filling system 1000 may also be battery-powered for environments where traditional power systems, connections, wiring, or networks are unavailable or inconvenient.

The bag filling system 1000 includes a power system 1014. The power system 1014 includes electronics. The wiring may include one or more power (e.g., AC, DC, etc.), busses, traces, and/or communications cords (e.g., serial, parallel, proprietary, etc.). The power system 1014 electrically powers the various components of the bag filling system 1000.

The controller 1002 is a programmable electronic device designed to automate and regulate the functions of the bag filling system 1000. The controller 1002 controls the sequential or parallel operations of bag retrieval, bag opening, bag positioning, substrate dispensing, and filling, based on predefined parameters or real-time sensor feedback. The controller 1002 may include hardware components such as microprocessors, input/output modules, and communication interfaces, along with software that enables process customization. The controller 1002 may integrate with sensors to monitor substrate characteristics like volume, density, and moisture, and adjusts the operation of the bag filling system 1000 to ensure precision in bag filling. The controller 1002 may interact with the user interface 1012 for easy configuration and may connect to external systems for data monitoring, diagnostics, and optimization of the overall production process. For example, the user interface 1012 may be utilized to specify the speed at which the bag filling system 1000 operates.

The various controls of the user interface 1012 may also be utilized to power on and off the bag filling system 1000 during normal operating conditions as well as during emergencies to protect users and other individuals proximate the bag filling machine 1000.

The controller 1002 manages the operation of the bag filling system 1000. The controller 1002 integrates or communicates with sensors 1024 that monitor the substrate's volume, density, weight, and moisture content, ensuring consistent filling for each bag regardless of material variations. Additionally, the controller 1002 provides customizable settings to accommodate different substrate types and bag sizes, allowing for real-time adjustments in the filling process (e.g., volume, speed, weight, moisture content, etc.). This controller 1002 is also designed to interface with external systems for data collection and process optimization, enabling users to monitor production efficiency and ensure compliance with industry standards.

The memory 1010 is a hardware element, device, or recording media configured to store data for subsequent retrieval or access at a later time. The memory 1010 may be static or dynamic memory. The memory 1010 may include a hard disk, random access memory, cache, removable media drive, mass storage, or configuration suitable as storage for data, instructions, and information. In one embodiment, the memory 1010 and controller 1002 may be integrated. The memory 1010 may use any type of volatile or non-volatile storage techniques and mediums. The memory 1010 may store data and information for operating the bag filling system 1000.

The user interface 1012 may include hardware, software, and firmware controls for operating the filling system 1000. In one embodiment, the user interface 1012 may include a power button 1040. The power button 1040 may be utilized to turn the filling system 1000 on and off. The power button 1040 may also act as an emergency shut off to protect users, objects, and the system 1000 itself.

The pneumatic arms 1020 are configured to move the fill bags into place. The pneumatic arms 1020 may include a first set of arms that retrieve the fill bag and a second set of arms that open the bag. Additional, pneumatic arms may be utilized to open and close stops to release a designated amount of substrate from the hopper and/or a fill receptacle. The suction applicators 1022 may be positioned at ends of the pneumatic arms 1020 to grip the fill bags. Suction may be applied to the suction applicators 1022 utilizing the compressor 1018 or a vacuum. Any number of hoses, tubes, or other communication mediums may be utilized to pneumatically power portions of the filling system.

The user interface 1012 may be made available through the various devices 201 of the system 200. In one embodiment, the user interface 1012 represents one or more of a graphical user interface, audio interface, tactile interface, or other interface that may be utilized to manage data, transactions, and other information. For example, the user may enter or update associated data for operating the filling system 1000 utilizing the user interface 1012 (e.g., browser or application on a mobile device).

The user interface 1012 may be presented based on execution of one or more applications, browsers, kernels, modules, scripts, operating systems, or specialized software that is executed by one of the respective devices 1001. For example, the filling system 1000 may automatically turn on/off at specified times to specified operation levels. The filling system 1000 may also be automatically turned off in response running out of bags, a failure/error, or other issue.

The user interface 1012 may display current and historical data as well as trends and projections for operation and performance of the filling system 1000. The user interface 1012 may be utilized to set the user preferences, parameters, and configurations of the filling system 1000 as well as upload and manage the data, content, and implementation preferences. The filling system 1000 may present, play, display or otherwise communicate information, data, and so forth (e.g., displays, indicators/LEDs, speakers, vibration/tactile components, etc.).

The filling system 1000 may communicate directly or indirectly with any number of devices 1001, systems, components, equipment, or networks. For example, the devices 1001 may include devices 1032, 1034, 1036. The devices 1001 may communicate through a network 1030. The devices 1032, 1034 may communicate through the network 1030. The device 1036 may communicate directly with the filling system 1000 through the transceiver 1026.

In one embodiment, the filling system 1000 may include specialized hardware (e.g. application specific integrated circuit (ASIC), communications enabled field programmable gate array (FPGA), etc.) or one or more processors executing an app, program, or set of instructions to implement the processes herein described. The filling system 1000 may include any number of elements, devices, components, systems, and equipment in addition to other computing and communications devices not specifically described herein for purposes of simplicity.

The filling system 1000 may communicate using wireless communications, such as Bluetooth, Wi-Fi, WiMAX, CDMA, GSM, PCS, or hardwired connections, such as fiber optics, T1, cable, DSL, high speed trunks, powerline networks, and telephone lines. Communications with the filling system 1000 may occur on any number of networks. In one embodiment, the network 1030 may include wireless networks, data or packet networks (i.e. the Internet), computer networks (e.g. Ethernet, personal area network, local area network, wide area network, etc.) cable networks, satellite networks, private networks, community networks, cloud networks and environments), or other types of communication networks.

The network 1030 is infrastructure for sending and receiving performance information, configuration details, fill details, bag levels, data, interfaces, webpages, portals, messages, data, packets, and signals according to one or more designated formats, standards, and protocols. The network 1030 may be any type of network including a public network, a wide area network, a local area network, one or more private networks, and the Internet.

Figure 11:
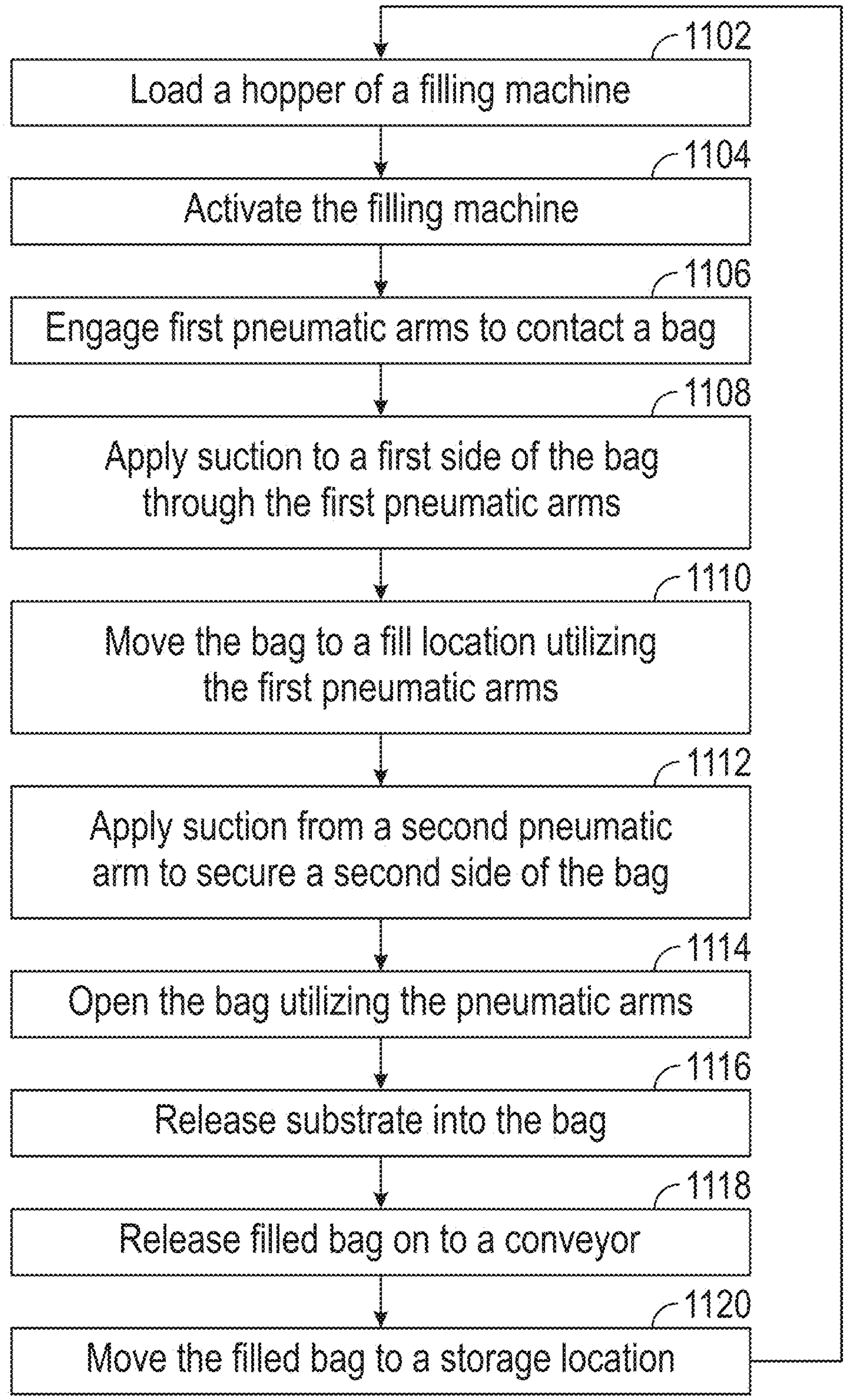
FIG. 11 is a flowchart of a process for filling bags with substrate utilizing a filling machine in accordance with an illustrative embodiment.

FIG. 11 is a flowchart of a process for filling bags with substrate utilizing a filling machine in accordance with an illustrative embodiment. The process of FIG. 11 may be performed by the filling machine 100 of FIGS. 1-5. The process may be implemented automatically or based on minimal input from the user (e.g., turning on the filling machine, setting fill amounts, etc.).

The process may begin with the hopper of a filling machine being loaded (step 1102). The hopper may be loaded automatically from a conveyor, auger, or other system that is integrated with the filling machine or external to the filling machine. The hopper may also be loaded by a user. As noted, the hopper may store any number of substrates that are subsequently loaded into bags. In one embodiment, the filling machine operates with specialty substrate bags utilized for growing mushrooms that may include an air filter or air input into the bag to promote growth.

Next, the filling machine is activated (step 1104). The filling machine may be activated in response to selection by a user of a power button, switch, dial, or other interface. In another embodiment, the filling machine may be remotely activated through an interconnected device, such as a tablet or cell phone executing an application that interfaces with the filling machine. The filling machine may also be automatically activated in response to sensing available fill bags, substrate in the hopper, and/or that the machine is engaged to operate.

Next, the filling machine engages first pneumatic arms to contact a bag (step 1106). The pneumatic arms may be moved into a position where the first pneumatic arms and corresponding suction applicators are touch, abutting, proximate, or near an opening of a bag stored in the filling machine. The bag may be one of numerous bags that are stored in a bag holder to be retrieved by the filling machine for filling with the substrate. The first pneumatic arm is moved to contact the bag near the opening of the bag. The first pneumatic arms may be configured to both rotate and to extend and retract. The first pneumatic arms may include sensors to ensure that the first pneumatic arms are in the correct position for each step of the filling process.

Next, the filling machine applies suction a first side of the bag though applicators of the first pneumatic arms (step 1108). A first side of the bag proximate the opening of the bag is suctioned by the first pneumatic arm and applicators. The applicators may apply suction to the bag at multiple points (e.g., multiple suction applicators) or as part of a single applicator.

Next, the filling machine moves the bag to a fill location step (1110). In one embodiment, the first pneumatic arms are configured to rotate inward (toward the middle of the filling machine). The first pneumatic arms may also extend as needed to move the bag to the fill location.

Next, the filling machine applies suction from a second pneumatic arm to secure a second side of the bag (step 1112). The second pneumatic arm may extend to contact or abut the bag for applying suction for gripping and moving the bag. The bag may be positioned so that even when substrate is added substantial forces or weight are not imposed on the first and second pneumatic arms.

Next, the filling machine opens the bag utilizing the pneumatic arms (step 1114). In one embodiment, one or both the second pneumatic arm and the first pneumatic arm may retract to open the bag. The first and second pneumatic arms may suction or grip the bag near the opening of the bag to more easily open the bag. In another embodiment, the filling machine may puff or box air into the bag to ensure that it fully opens for filling.

Next, the filling machine releases substrate into the bag (step 1116). In one embodiment, the filling machine may release a pre-measured amount of substrate from a fill receptacle in to the bag. The hopper may automatically refill the fill receptacle after filling the bag so that the filling machine is ready for the next bag. Alternatively, the substrate may be released directly from the hopper by weight, volumetric measure, or so forth.

Next, the filling machine releases a filled bag on to a conveyor (step 1118). The conveyor may represent a single conveyor or multiple conveyors. The conveyor moves the filled bag so that the next bag may be filled. The conveyor may alternatively be one or more rollers, tracks, or so forth.

Next, the filling machine moves the filled bag from the fill location to a storage location (step 1120). In one example, the filling machine may move the filled bag into a bin that may then be processed (e.g., add fungi, seeds, etc.). The filling machine may also be connected to rollers or a series of conveyors that may add additional materials, seal the bag, label the bag, package the bag, or otherwise process the filled bag for growth or utilization.

The features, steps, and components of the illustrative embodiments may be combined in any number of ways and are not limited specifically to those described. In particular, the illustrative embodiments contemplate numerous variations in the smart devices and communications described. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of embodiments, processes or methods of the invention. It is understood that any other modifications, substitutions, and/or additions may be made, which are within the intended spirit and scope of the disclosure. For the foregoing, it can be seen that the disclosure accomplishes at least all of the intended objectives.

The illustrative embodiments are not to be limited to the particular embodiments and examples described herein. In particular, the illustrative embodiments contemplate numerous variations in the type of ways in which embodiments of the invention may be applied to air filtering, purification, and sterilization. The foregoing description has been presented for purposes of illustration and description. It is not intended to be an exhaustive list or limit any of the disclosure to the precise forms disclosed.

It is not intended to be an exhaustive list or limit any of the disclosure to the precise forms disclosed. The previous detailed description is of a small number of embodiments for implementing the invention and is not intended to be limiting in scope. The following claims set forth a number of the embodiments disclosed with greater particularity. It is contemplated that other alternatives or exemplary aspects are considered included in the disclosure. The description is merely examples of embodiments, processes or methods of the invention. It is understood that any other modifications, substitutions, and/or additions may be made, which are within the intended spirit and scope of the disclosure. For the foregoing, it can be seen that the disclosure accomplishes at least all of the intended objectives.

The previous detailed description is of a small number of embodiments for implementing the invention and is not intended to be limiting in scope. The following claims set forth a number of the embodiments disclosed with greater particularity.

What is claimed:

1. A method for filling bags with substrate, the method comprising:

receiving bags in a receptacle of a filling machine;

receiving substrate in a hopper of the filling machine;

determining an amount of the substrate to fill a bag based on volume, density, weight, and moisture content of the substrate;

controlling a first stop at a top of a fill receptacle and a second stop at a bottom of the fill receptacle based on the amount of the substrate to fill the bag;

receiving an activation signal at the filling machine;

moving a first pneumatic arm to abut an opening of a first side of a bag that is one of the bags after receiving the activation signal;

applying suction to the bag utilizing one or more nozzles integrated with the first pneumatic arm;

moving the bag to a fill location using the first pneumatic arm;

moving a second pneumatic arm to abut the opening on a second side of the bag after the bag is at the fill location;

applying suction to the bag utilizing one or more second nozzles integrated with the second pneumatic arm;

retracting at least one of the first pneumatic arm and the second pneumatic arm to open the opening of the bag;

releasing the amount of the substrate into the bag; and moving the bag from the fill location to a storage location.

2. The method according to claim 1, further comprising: adding a substrate to the fill receptacle, wherein the substrate is released from the fill receptacle into the bag.

3. The method according to claim 1, further comprising: loading the hopper with substrate.

4. The method according to claim 1, wherein the bag is moved by a conveyor to a storage location.

5. The method according to claim 1, wherein the bags include a filter promoting air flow.

6. The method according to claim 1, further comprising: adding spores to the bag filled with the substrate.

7. The method according to claim 1, further comprising: communicating information regarding the bags filled by the filling machine.

8. The method according to claim 1, further comprising: sensing the positions of the first pneumatic arm and the second pneumatic arm and application of suction.

9. The method according to claim 1, wherein the filling machine includes a user interface for receiving the activation signal based on a selection by a user.

10. The method according to claim 1, further comprising: turning off process of the filling machine in response to activation of an emergency shut down.

11. A bag filling machine, the bag filling machine comprising:

a frame supporting components of the filling machine;

a plurality of sensors for monitoring a bag filling process performed by the machine and determining volume, density, weight, and moisture content of a substrate;

a controller controlling operations of the filling machine, wherein the controller is operatively connected to the plurality of sensors and wherein the controller is configured to determine an amount of substrate for a bag based on the volume, density, weight, and moisture content of the substrate;

a hopper extending from the frame storing the substrate;

a fill receptacle extending from below the hopper for dispensing the substrate;

a bag holder extending from the frame for storing a plurality of bags including the bag;

a first stop positioned at a top of the fill receptacle to control flow of the substrate from the hopper into the fill receptacle, wherein the first stop is pneumatically controlled;

a second stop positioned at a bottom of the fill receptacle, wherein the second stop is pneumatically controlled, whereby the controller controls the first stop and the second step to control the amount of the substrate for the bag;

a first pneumatic arm configured to rotate and extend to independently retrieve and transport the bag from a first side to a filling location;

one or more first vacuum applicators at a distal end of the first pneumatic arm to secure the bag from the first side;

a second pneumatic arm configured to extend to abut the bag from a second side after the bag is positioned at the filling location by the first pneumatic arm;

one or more second vacuum applicators at a distal end of the second pneumatic arm to secure the bag from a second side; and a conveyor configured to move a filled bag from the filling location to a second location.

12. The bag filling machine of claim 11, wherein the controller controls the first pneumatic arm, the first vacuum applicator, the second pneumatic arm, and the second vacuum applicator.

13. The bag filling machine of claim 11, wherein the first pneumatic arm and the second pneumatic arm retract to open the bag for filling.

14. The bag filling machine of claim 11, further comprising:

a user interface including at least an emergency stop for turning the filling machine off.

15. The bag filling machine of claim 11, further comprising:

a plurality of pneumatic arms connected to the stops configured to fill the fill receptacle with substrate from the hopper.

16. The bag filling machine of claim 11, wherein the frame includes feet for leveling the filling machine.

17. The bag filling machine of claim 11, further comprising:

sensors for determining the location and position of the first pneumatic arm and the second pneumatic arm.

18. The bag filling machine of claim 11, wherein the first pneumatic arm is rotatably connected to the frame.

19. The bag filling machine of claim 11, wherein the second location is a receptacle at an end of the conveyor.

20. The bag filling machine of claim 11, wherein the controller controls a vacuum for the first vacuum applicator and second vacuum applicator, a compressor for the first pneumatic arm and the second pneumatic arm, and a motor for the conveyor.

* * * * *